United States Patent Office.

THOMAS BRISTOW, OF CRANSTON, RHODE ISLAND, ASSIGNOR TO AMASA SPRAGUE, OF SAME PLACE.

Letters Patent No. 100,365, dated March 1, 1870.

IMPROVEMENT IN THE MANUFACTURE OF MADDER DYES.

The Schedule referred to in these Letters Patent and making part of the same.

*To whom it may concern:*

Be it known that I, THOMAS BRISTOW, of Cranston, in the county of Providence, and State of Rhode Island, have invented certain new and useful Improvements in the Preparation of Garancine for the Manufacture of "Oleizarine," so called; and I hereby declare the following to be a full, clear, and exact description of the same.

My invention relates to the preparation of garancine to be used in the manufacture of an extract of madder, called "oleizarine." This extract is produced by boiling garancine in kerosene oil, and then separating from the oil the coloring matter held in it, in accordance with the process claimed by Alfred Paraf.

The manufacture of the oleizarine it is not necessary here to describe, as my invention relates only to the preparation of the garancine to be used in such manufacture.

It is well known that garancine is produced by heating ground madder with dilute sulphuric acid, and then washing the mass in water to remove the acid; chalk, carbonate of soda, or other like agent being employed in proper quantity to neutralize the acid that may still be held in the madder, notwithstanding the washing. The garancine thus prepared is pressed and dried and ground, and is then in condition to be used for ordinary dyeing.

In the manufacture of oleizarine it has been practicable heretofore to use only this ordinary commercial garancine, and it has been impossible to produce the desired result by the employment of garancine in its wet state; that is to say, after it has been pressed or strained to remove most of the water, and before it has been heated and dried, in which state it is known as wet garancine. It has been my object to use the wet garancine for the manufacture of oleizarine, thus dispensing with the drying and subsequent processes, which are expensive and costly, and shortening the time required for the preparation of the garancine. This result I have obtained in the following manner.

I prepare the madder in the manner ordinarily followed in making garancine, and mix with it the dilute sulphuric acid or other acid employed, in accordance with the usual practice. The madder is then washed in water, so as to remove the greater portion of the acid, three, four, five, or six washings being employed, as may be found necessary. In the last washing it has heretofore been the practice to add a suitable quantity of chalk, carbonate of soda, or equivalent agent to neutralize whatever acid may remain in the madder. This neutralizing agent I do not employ, and the garancine is thus left with an acid preponderance. It is this that fits the garancine to be used in its wet state for the manufacture of oleizarine.

Repeated experiments have demonstrated that the use of the neutralizing agent renders the wet garancine wholly unavailable, and is is only when the chalk or like substance is omitted that the oleizarine can be produced from the wet article.

After the last washing, therefore, in which the chalk has not been employed, the garancine is pressed or strained, so as to remove most of the water, and then, in its wet or moist state, it is ready to be used for the manufacture of the oleizarine. I thus dispense with the drying and further processes ordinarily employed to perfect the garancine, and shorten considerably the time consumed in its preparation.

It is also noticeable that the colors produced from oleizarine made from this wet garancine are better and more brilliant than those obtained from oleizarine, the product of ordinary commercial garancine.

Having now described my invention, and the manner in which the same is or may be carried into effect,

What I claim, and desire to secure by Letters Patent, is—

The method herein described of preparing garancine to be used in the manufacture of "oleizarine," so called, substantiallly as and for the purposes set forth.

In testimony whereof I have signed my name to this specification before two subscribing witnesses.

THOMAS BRISTOW.

Witnesses:
    M. BAILEY,
    SAMUEL B. PARKER,
    AMASA SPRAGUE.